3,160,623
MANUFACTURE OF ARYL DIAZONIUM
FLUORIDES
Louis G. Anello and Cyril Woolf, Parsippany, N.J., assignors to Allied Chemical Corporation, New York, N.Y., a corporation of New York
No Drawing. Filed Dec. 23, 1960, Ser. No. 77,804
11 Claims. (Cl. 260—141)

This invention relates to manufacture of aryl fluorides, and more particularly to processes for preparing aryl diazonium fluoride intermediates which may be thermally decomposed to the corresponding aryl fluorides.

Aryl fluorides are becoming of increasing importance, particularly for instance, in the synthesis of biologically active compounds. Commercial difficulties in direct controlled fluorination of the aromatic nucleus of aromatic amines make the diazonium route to the aryl fluorides of much practical interest. It is know that diazonium fluorides and fluoborates readily decompose at suitable temperatures with formation of the corresponding aryl fluorides. It is also known that diazotization and decomposition may be carried out substantially simultaneously. Nevertheless, the production of aryl fluorides from diazonium compounds is still subject to many disadvantages, especially with regard to the preparation of the aromatic diazonium. Of the methods known in the art, all present one or more operating problems involving the formation of undesirable by-products, the presence of side reactions, and recovery of products and materials used in the process. These problems adversely affect overall efficiency and particularly yield.

An object of this invention is to provide improved processes for preparing aromatic diazonium fluorides for decomposition in high yield to corresponding aryl fluorides. Another major objective is to afford, for preparation and decomposition of aryl diazonium fluorides to corresponding aryl fluorides, processes in which undesirable by-products, competing side reactions, and recovery problems are minimized or substantially eliminated.

In accordance with the invention, it has been found that primary aromatic amines and a nitrosyl fluoride diazotizing agent—of the group consisting of nitrosyl fluoride, NOF, NOF.$x$HF complexes in which $x$ is 3 or 6, and mixtures of any two or all three—may be advantageously reacted in the presence of anhydrous hydrogen fluoride and at a suitable temperature to form the corresponding aryl diazonium fluorides. We find that the disadvantages of the known prior art processes may be practically overcome if the diazotizing agent charged to the reaction is a fluoride compound as indicated and is pre-formed and fed to the reaction as such. The diazonium fluorides so formed then may be decomposed readily to the corresponding aryl fluorides which are obtained in improved yield. Use of solid reactants is specifically avoided and, if desired, both reactants and reaction conditions can be liquid. Another important characteristics of the invention process is formation of only fluorides, nitrogen compounds, and water, the latter being reduced in amount and deleterious effect as hereinafter described. Undesirable by-product formation and competing side reactions are substantially eliminated, and the anhydrous hydrogen fluoride, employed in the process as a reaction medium and alternatively as a constituent of the diazotizing agent, may be easily recovered for reuse in the process.

Nitrosyl fluoride, NOF, is a known and available normally colorless gas material having a boiling point of about minus 56° C. Nitrosyl fluoride may be made, as known, by passing nitrosyl chloride over silver fluoride in a platinum tube at elevated temperatures, or by direct reaction of nitric oxide and elemental fluorine. The nitrosyl fluoride-hydrogen fluoride complexes, NOF.3HF and NOF.6HF or mixtures of these complexes, utilized as source of fluorine in accordance with the present invention, may be made by reaction of nitrosyl chloride and anhydrous HF, for example as follows.

The reactor employed was an unpacked nickel tube 1" I.D. x 36" long mounted in an electrically heated furnace 30" long. Throughout the run, the reactor was heated to about 60° C. During a period of about 4 hours, a vaporous mixture consisting of about 11.3 mols (226 g.) of HF and about 1.82 mols (118 g.) of NOCl was passed into the reactor. Ratio of HF to NOCl was about 6 to 1, and reaction contact time was about 18 sec. Products exiting the reactor were passed into the bottom of a 1 inch by 2 foot vertically disposed nickel still packed with nickel "Heliopak," and provided at the top with a reflux condenser cooled by a Dry Ice-acetone mixture. The HCl formed passed through the reflux and was absorbed by a water scrubber located after the still. All other materials exiting the reactor were condensed and held in the still during the run. On completion of the run, the condensate thus collected was distilled and there were recovered about 45 gms. (0.69 mol) of a fraction boiling in the range of minus 5 to zero degrees C. and comprising mostly NOCl; about 86 gms. (4.3 mols) of a fraction boiling in the range of 17–20° C. and comprising mostly HF; about 60 gms. of a fraction boiling in the range of 63–69° C.; and about 96 gms. of a pot residue boiling above about 70° C. The 63–69° C. fraction was redistilled and had a boiling point of about 68° C., and was liquid NOF.6HF complex. The pot residue fraction on redistillation showed a boiling point of about 95° C., and was liquid NOF.3HF complex. The NOF.6HF complex pyrolyzes at about 77–81° C. to HF and NOF.3HF complex. Hence, the mixture collected in the still after refluxing and at completion of the run as noted above, may be converted wholly to the NOF.3HF complex by heating to say 90° C. Further, it will be understood that when the material is heated sufficiently to convert all of the same to vaporous form, all complex of the vapor is the NOF.3HP, i.e. at temperature above 95° C. (atmospheric pressure), all of the complex exists as NOF.3HF.

Nitrosyl fluoride may be available in liquid or gas form. The NOF.3HF complex is usually initially in the form of a liquid which, if all NOF.3HF complex, boils at about 95° C. The NOF.6HF complex is usually initially in the form of a liquid which, if all NOF.6HF complex, boils at about 68° C. The complexes, which may be represented by NOF.$x$HF where $x$ is 3 or 6, may be available as liquid mixtures of such proportions that $x$ may vary within the limits of 3 to 6 inclusive.

Overall operations or processes of the invention are believed to be represented by the reactions, (1) R—NH$_2$+NOF$x$(HF)→RN=N.F+H$_2$O+$x$(HF), 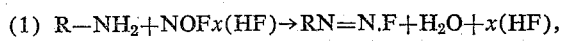
and
(2) RN=NF→RF+N$_2$ 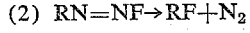

in which R is a member of the group consisting of unsubstituted aryl radicals and substituted aryl radicals in which one or more of the nuclear hydrogen atoms is replaced by a substituent, such as an alkyl, alkoxy, bromo, chloro, carboxy, m-hydroxy, o-hydroxy, nitro, or sulfo (i.e. sulfonic acid) group.

Procedurally, practice of the invention involves subjecting certain aromatic primary mono-amines dissolved in liquid anhydrous hydrogen fluoride and at relatively low reactive temperatures to the action of a nitrosyl fluoride diazotizing agent selected from the group consisting of NOF, NOF.$x$HF complexes in which $x$ is 3 or 6, and mixtures thereof, decomposing the resulting corresponding aryl diazonium fluoride by heating at higher temperatures to form the corresponding aryl fluoride, and recovering the aryl fluoride from the resulting reaction mass.

In carrying out the invention, there may be employed as amine starting materials various aromatic primary mono-amines, including those free from further substituents and those containing one or more nuclear substituents such as those recited above. In the better embodiments of the invention, the aromatic primary mono-amines are those in which the aromatic nucleus is that of a mono-nuclear aromatic hydrocarbon or a derivative thereof in which one to three, and preferably one to two, nuclear hydrogen atoms are replaced by substituents selected from the group consisting of lower alkoxy, bromo, chloro, carboxy, m-hydroxy, o-hydroxy, nitro, and sulfo. As employed herein, including the claims, the term "mono-nuclear aromatic hydrocarbon" denotes and includes benzene and its homologs.

As the first step in the invention process preferably the aromatic amine is admixed with and dissolved in a relatively large excess of liquid anhydrous HF reaction medium which HF may be fed into the liquid amine in the form of gas or liquid. The NOF reactant material then is added preferably in controlled amounts to facilitate maintenance of the desired diazotization temperature. Of the indicated NOF reactants, the nitrosyl fluoride-hydrogen fluoride complexes are preferred since these materials are liquids at the herein diazotizing reaction temperatures and are more easily and economically handled than the gaseous nitrosyl fluoride, NOF. Moreover, the complexes preferably employed are mixtures of the individual complexes substantially as formed during their preparation. Apparatus employed is relatively simple, and in general may be along the lines indicated in the appended examples. Reactors may be equipped with suitable reflux and/or refrigerating means chiefly to prevent loss of HF, B.P. 19.4° C., by vaporization at diazotizing temperatures employed. Apparatus throughout may be made of e.g. Monel or other material suitably resistant to the action of the process materials involved. In various modifications of the invention one or more reactors may be used, for example, diazotization may be carried out in one reactor and the reaction mixture transferred to a second reactor for decomposition of the diazonium fluoride to aryl fluoride product. The process may be modified to operate continuously as well as batchwise. Although reduced or superatmospheric pressure may be used, no particular advantage is gained, and all phases of the invention are such that atmospheric pressure is usually employed.

In the better embodiments of the invention, diazotization and decomposition are carried out in substantially separate stages, and diazotization and decomposition temperatures are provided accordingly. In all modifications, diazotizing temperatures below about minus 30° C. afford no advantage. When diazotizing in a substantially separate stage, diazotizing is carried to completion at a temperature of about minus 30° C. and higher but low enough to prevent any substantial evolution of nitrogen, since it has been found that to afford the better results evolution of any substantial volumes of nitrogen during decomposition is notably undesirable during diazotization. Practice indicates that at temperature of about plus 25° C., decomposition and resultant evolution of nitrogen initiates. Hence, maximum diazotizing temperature of about plus 10° C. is preferred. In best practice, diazotization is substantially completed while maintaining temperatures of substantially in the range of minus 10° C. to plus 10° C. Duration time of diazotization reaction is variable and dependent upon factors such as stirring, temperature, ratio of diazotizing agent to amine, and ratio of HF reaction medium to amine. In general, reasonable completion of diazotization may be effected within a period of one to two hours, and more usually in a shorter interval of about half to one hr. Under optimum operating conditions diazotization per se may be almost instantaneous. If desired, end point of diazotization may be determined by use of conventional indicators.

On substantial completion of diazotization, decomposition of the particular aryl fluoride may be effected by heating the diazonium fluoride reaction mass to temperature high enough to effect evolution of nitrogen. As indicated, such temperature is about 25° C. Decomposition temperatures above about 70° C. not only afford no advantages but also tend to decrease yields. Hence, decomposition temperatures are substantially within the range of 25-70° C. at atmospheric pressure, and maximum decomposition temperatures of say 50-60° C. are the more usual. Duration time of decomposition is likewise widely variable, though ordinarily may be effected within the period of say 2 to 6 hours. Cessation of evolution of nitrogen denotes end point of decomposition. Although not a preferred procedure, certain of the invention advantages may be afforded by carrying out the diazotization and decomposition reactions more or less simultaneously, i.e. under conditions in which there is no marked line of demarcation between cessation of diazotization and commencement of decomposition. In this situation, reasonable degrees of diazotization may be effected anywhere within the range of about minus 30° C. up to about 50° C., the major portion of diazotization taking place in the lower part of such temperature range while in the upper portion thereof decomposition may predominate. Usually, the major portion of decomposition is effected at temperatures higher than those at which the major portion of diazotization is accomplished.

In all embodiments of the invention mol ratios of HF to aromatic amine may be varied within fairly wide limits and generally lie in the range of about 2 to 10 mols of HF per mol of aromatic amine charged. Upper limit of HF is mostly a matter of convenience and economy since high ratios necessitate recovery of large quantities of HF. The lower limit is more important as being required to provide sufficient HF to dissolve the aromatic amine and take up water formed during diazotization. More suitable ratios of HF to amine are in the range of about 3:1 to 8:1, with ratios within the range of about 5:1 to 6:1 usually being employed.

With regard to the amount of nitrosyl fluoride diazotizing agent employed, the NOF constituent thereof is controlling. The theory of the first of the foregoing equations indicates one mol of NOF equivalent per mol of amine. In practice, we have been able to employ moderate NOF excesses which may be in amount up to about 1.7 mols of NOF per mol amine, preferably about 1.0 to 1.5 mols of NOF material per mol of amine. A specific advantage gained is that excess NOF is hydrolyzed to additional HF with a corresponding reduction in amount of water which, when present in the reaction mixture induces undesirable side reactions and reduction of yield caused primarily by hydrolysis of the diazonium. With the amount of water in the reaction mixture reduced to minimum, the remaining water is taken readily up by the liquid hydrogen fluoride medium with the result that reaction conditions remain substantially anhydrous and undesirable side-reactions are effectively reduced, if not virtually eliminated, all of which contribute to improved results. In particular cases where the aminoaromatic starting material has been substituted by a hydroxyl group, e.g. in preparing m-fluorophenol from m-aminophenol, it is more desirable to employ the starting material and NOF constituent of diazotizing agent in approximately stoichiometric amounts, preferably no more than about 1.1 mols of NOF per mol of hydroxyl substituted amine. It is uncertain why it is advantageous to employ less NOF reactant in the case of hydroxyl substituted amines. However, indications are that excess NOF has a more deleterious affect on the less stable hydroxyl group than water.

Recovery of aryl fluoride from the reaction mass on completion of decomposition may be effected by known chemical techniques along the lines illustrated in the following examples which demonstrate practice of the invention.

*Example 1.*—The reactor employed was a Monel pot equipped with a nickel stirrer, a nickel reflux condenser cooled to minus 78° C. by a Dry Ice-acetone bath, a distillation connection, and suitable inlet tubes for introduction of aromatic amine, anhydrous hydrogen fluoride, and liquid NOF.$x$HF complex material. The reactor was cooled to about minus 10° C., and about 2.0 mols (196 g.) of aniline were added. About 10.0 mols (200 g.) of vaporous anhydrous HF were charged, providing a mol ratio of HF to aniline of about 5 to 1. Adequate cooling was easily maintained by the condenser. During a period of about ½ hour, about 3.0 mols (380 g.) basis NOF constituent, of liquid NOF.$x$HF complex material were added by means of a nickel dropping funnel while maintaining the reactor temperature at about zero ° C. The nitrosyl fluoride-hydrogen fluoride complex material mixture contained NOF.3HF and NOF.6HF in proportions such that the $x$ of NOF.$x$HF corresponded to about 3.8. Mol ratio of NOF.$x$HF complex to aniline was about 1.5:1. The reaction mixture was allowed to stand at about zero to 5° C. for 1½ hrs., and then slowly warmed during the next 2 hours to temperature of about 35° C. Decomposition, as evidenced by evolution of nitrogen, began slowly at about 25° C. and proceeded briskly at about 35° C. At the end of the 2 hours distillation was started and continued over the next 1½ hours, within which time pot temperature was increased slowly to about 50° C. During distillation, the distillate was totally condensed in a cold trap maintained at about minus 78° C. by a Dry Ice-acetone bath. The condensate in the trap was a liquid containing fluorobenzene, HF, and trace amounts of $NO_2$. The material left in the reactor was a tarry residue plus unreacted NOF.$x$HF complex. About 440 g. of condensate, recovered in the cold trap, were poured over ice to convert the anhydrous HF in the mixture to hydrous HF and at the same time avoid vaporization of fluorobenzene and HF. The resulting liquor was treated with NaCl in the usual way to salt out the organic as an oil. The oil and aqueous layers were separated, and there were recovered 180 g. of crude fluorobenzene oil containing small amounts of HF, NaCl and water as contaminants. The crude oil was water washed, dried by means of calcium chloride, and redistilled. About 166 g. of fluorobenzene B.P. 84.5° C., a known compound, were recovered, i.e. yield about 85 mol percent of theory. The contents of the reactor were neutralized and steam distilled. The resulting condensate contained practically no organic, indicating that all organic except a small amount of resinous material was removed by the first distillation.

*Example 2.*—Apparatus employed was as in Example 1. The reactor was cooled to about minus 10° C., and about 8.75 mols (175 g.) of anhydrous hydrogen fluoride and about 1.76 mols (238 g.) of 4-cumidine were charged. Ratio of HF to 4-cumidine was about 5 to 1. During a period of about 1½ hours about 2.66 mols (332 g., basis, NOF constituent) of liquid NOF.$x$HF complex material were added while maintaining the reactor temperature at about 0° C. The complex material contained NOF.3HF and NOF.6HF in proportions such that the $x$ corresponded to about 3.8 i.e. the same as in Example 1. Mol ratio of complex to cumidine was about 1.5:1. The reaction mixture was stirred at about zero–5° C. for about two hours. During the next 4 hours the mixture in the pot slowly warmed, and decomposition was completed at temperature of about 60° C. Decomposition commenced at about 30° C., and above about 46° C. about 250 grams of HF were distilled off and was recovered in a minus 78° C. cold trap. The reaction mixture, remaining in the pot and containing 4-fluorocumene, excess NOF.$x$HF and some resinous material, was then cooled to about 10° C., and poured over ice. The resulting aqueous liquor was neutralized with caustic and steam distilled. There were recovered about 3000 g. of a liquid condensate containing 4-fluorocumene and water, with some water and tarry residue remaining in the pot after steam distillation. The condensate was extracted with ether, and there were recovered about 307 g. of the mixture of crude oil and ether which, after drying over calcium chloride, amounted to about 297 g. The latter was distilled at atmospheric pressure, ether was stripped off, and there were recovered about 197 g. of 4-fluorocumene (B.P. 155.5° C.), a known compound, representing a yield of about 81–83% of theory.

*Example 3.*—Apparatus and procedure employed were similar to those of Example 2. The reactor was cooled to about minus 20° C., and during the course of 20 minutes about 10.0 mols (200 g.) of anhydrous hydrogen fluoride and about 2.0 mols (218 g.) of m-aminophenol were charged. Ratio of HF to m-aminophenol was about 5 to 1. During a period of ½ hour, about 2.88 mols (360 g., basis, NOF constituent) of the same liquid NOF.$x$HF complex material as in Examples 1 and 2 were added while maintaining the reactor temperature at minus 10° C. Mol ratio of complex to aminophenol was about 1.44:1. The reactor mixture was stirred at zero–5° C. for about 1¾ hours, and during the next 3 hours slowly warmed and decomposition was completed at about 50° C. Decomposition commenced at about 25° C., and at about 60° C. about 155 g. of HF was distilled off and recovered in a minus 78° C. cold trap. The resulting reaction mixture, containing m-fluorophenol and some NOF.$x$HF complex, was then cooled to about 10° C., poured onto ice and neutralized with caustic soda as in Example 2. The neutralized liquor was acidified with HCl to a pH of about 7 to facilitate liberation of phenol, and the resulting liquor was steam distilled as in Example 2. There were recovered about 4000 g. of a liquid condensate containing m-fluorophenol, and water, leaving some water and resinous material in the pot after steam distillation. The condensate was extracted with ether as in Example 2, and there were recovered about 406 g. of a mixture of crude oil and ether which, after drying over calcium chloride, amounted to about 394 g. The latter was distilled at atmospheric pressure to remove ether, and then at 45 mm. to recover about 120 g. of m-fluorophenol (B.P. 97.5° C./45 mm.), a known compound, representing a yield of about 54% of theory.

*Example 4.*—Apparatus and procedure employed were about the same as in Example 3. The reactor was cooled to about minus 20° C., and about 10 mols (200 g.) of anhydrous hydrogen fluoride and about 2.05 mols (224 g.) of m-aminophenol were charged. Ratio of HF to m-aminophenol was about 5 to 1. During a period of about ½ hour, about 2.1 mols (293 g., basis, NOF constituent) of the same liquid NOF.$x$HF complex material as in previous examples were added while maintaining the reactor temperature at around minus 10–5° C. Mol ratio of complex to aminophenol was about one plus to one. The reactor mixture was stirred at 0–5° C. for about one hour, and during the next 2 hours slowly warmed and decomposition was completed at about 45° C. Decomposition commenced at about 25° C. and above about 60° C. about 274 g. of HF was distilled off and recovered in a minus 78° C. cold trap. The resulting reaction mixture, containing m-fluorophenol and some excess NOF.$x$HF, was then cooled to about 10° C., poured onto ice and neutralized with sodium carbonate. The neutralized liquor was acidified with HCl as in Example 3, and the resulting liquor was steam distilled as previously. There were recovered about 4000 g. of a liquid condensate containing m-fluorophenol and water, with some water and resinous material left in the pot after distillation. The condensate was extracted with ether as previously, and there were recovered about 350 g. of a mixture of crude oil and ether which, after drying over calcium chloride, amounted to about 340 g. The latter was distilled partly at atmospheric pressure and partly at 45 mm., as in Example 3, ether was stripped off, and there were recovered about 152 g. of m-fluorophenol, representing a yield of about 66% of theory.

*Example 5.*—Apparatus and procedure employed were about the same as in Example 3. The reactor was cooled to about minus 10–20° C., and about 10 mols (200 g.) of anhydrous hydrogen fluoride and about 2.06 mols (225 g.) of m-aminophenol were charged. Ratio of HF to m-aminophenol was about 5 to 1. During a period of about ½ hour, about 2.0 mols (283 g., basis, NOF constituent) of the same liquid NOF.$x$HF complex material as in previous examples were added while maintaining the reactor temperature at around minus 10–5° C. Mol ratio of complex to aminophenol was about one to one. The reactor mixture was stirred at 0–5° C. for about one hour, and during the next 2 hours slowly warmed and decomposition was completed at about 45° C. Decomposition commenced at about 25° C. and above about 60° C., about 250 g. of HF was distilled off and recovered in a minus 78° C. cold trap. The resulting reaction mixture, containing m-fluorophenol and some excess NOF.$x$HF, was worked up as in Example 4, and after steam distilling and ether extraction as previously, there was recovered a mixture of crude oil and ether which, after drying over calcium chloride, amounted to about 583 g. The latter was distilled partly at atmospheric pressure and partly at 45 mm., as in Example 3, ether was stripped off, and there were recovered about 150 g. of m-fluorophenol, representing a yield of about 66% of theory.

Instead of the amine starting materials employed in the above examples, compounds such as the following may be employed: o-toluidine; p-toluidine; 2,4-xylidine; 2-amino-5-chloro-p-toluenesulfonic acid; 2-amino-5-nitrobenzenesulfonic acid; 2-amino-1-phenol-4-sulfonic acid; 4-amino-m-toluene sulfonic acid; p-aminobenzoic acid; anthranilic acid; m-nitroaniline; 2-nitro-p-anisidine; 4-nitro-o-anisidine; 2-nitro-p-toluidine; 2-amino-4-nitrophenol; sulfanilic acid; 4-chloro-o-anisidine; 2-chloro-4-nitroaniline; 4-chloro-o-toluidine; and 2,5-dichloroaniline.

The herein outlined method for making NOF.3HF and NOF.6HF complexes, from nitrosyl chloride and HF, is more fully described and claimed in our copending application Serial No. 77,805, filed December 23, 1960.

We claim:

1. The process for preparing aryl diazonium fluorides which comprises dissolving in liquid substantially anhydrous hydrogen fluoride an aromatic primary mono-amine selected from the group consisting of those in which the aromatic nucleus is that of a mono-nuclear aromatic hydrocarbon, and derivatives of the same in which one to three nuclear hydrogen atoms are replaced by substituents selected from the group consisting of lower alkoxy, bromo, chloro, carboxy, m-hydroxy, o-hydroxy, nitro, and sulfo; introducing into the resulting solution a nitrosyl fluoride diazotizing agent selected from the group consisting of NOF.3HF, NOF.6HF and mixtures thereof, and subjecting said mono-amine to the action of said agent while maintaining temperatures substantially in the range of minus 30° C. to plus 10° C., to thereby form the corresponding aryl diazonium fluoride.

2. The process for preparing aryl diazonium fluorides which comprises dissolving in liquid substantially anhydrous hydrogen fluoride an aromatic primary mono-amine selected from the group consisting of those in which the aromatic nucleus is that of a mono-nuclear aromatic hydrocarbon, and derivatives of the same in which one to two nuclear hydrogen atoms are replaced by substituents selected from the group consisting of lower alkoxy, bromo, chloro, carboxy, m-hydroxy, o-hydroxy, nitro, and sulfo; introducing into the resulting solution a nitrosyl fluoride diazotizing agent selected from the group consisting of NOF.3HF, NOF.6HF and mixtures thereof, and subjecting said mono-amine to the action of said agent while maintaining temperatures substantially in the range of minus 30° C. to plus 10° C., quantity of said agent being such as to provide a mol ratio of agent, basis NOF constituent, to mono-amine substantially in the range of 1:1 to 1.7:1, to thereby form the corresponding aryl diazonium fluoride.

3. The process for preparing an aryl diazonium fluoride of phenol which comprises dissolving m-aminophenol in liquid substantially anhydrous hydrogen fluoride, introducing into the resulting solution a nitrosyl fluoride diazotizing agent selected from the group consisting of NOF.3HF, NOF.6HF and mixtures thereof, subjecting said m-aminophenol, at temperatures substantially in the range of minus 30° C. to plus 10° C., to the action of said diazotizing agent in quantity to provide a mol ratio of diazotizing agent, basis NOF constituent, to m-aminophenol substantially in the range of 1:1 to 1.1:1, to thereby form the corresponding aryl diazonium fluoride.

4. The process of claim 1 in which the nitrosyl fluoride diazotizing agent is a liquid mixture of NOF.3HF and NOF.6HF.

5. The process of claim 1 in which the mol ratio of HF to mono-amine is within the range of about 2:1 to 10:1.

6. The process of claim 1 in which the mono-amine is aniline.

7. The process of claim 1 in which the mono-amine is 4-cumidine.

8. The process of claim 1 in which the mono-amine is m-aminophenol.

9. The process of claim 2 in which the nitrosyl fluoride diazotizing agent is a liquid mixture of NOF.3HF and NOF.6HF.

10. The process of claim 2 in which the mono-amine is aniline.

11. The process of claim 2 in which the mono-amine is 4-cumidine.

References Cited in the file of this patent
UNITED STATES PATENTS

| | | |
|---|---|---|
| 2,563,796 | Shenk et al. | Aug. 7, 1951 |
| 2,576,065 | Britton et al. | Nov. 20, 1951 |
| 2,705,730 | Head | Apr. 5, 1955 |

OTHER REFERENCES

Voznesenkii et al.: Chem. Abstracts, 32:8379 (1958) 1 page.